United States Patent [19]

Nishigaki et al.

[11] Patent Number: 5,043,871
[45] Date of Patent: Aug. 27, 1991

[54] METHOD AND APPARATUS FOR DATABASE UPDATE/RECOVERY

[75] Inventors: Toru Nishigaki, Sagamihara; Sadasaburo Kanai, Yokohama; Kazuaki Masamoto, Yokosuka, all of Japan

[73] Assignee: Hitachi, Ltd., Tokyo, Japan

[21] Appl. No.: 31,835

[22] Filed: Mar. 26, 1987

[30] Foreign Application Priority Data

Mar. 26, 1986 [JP] Japan .................................. 61-65643
Apr. 18, 1986 [JP] Japan .................................. 61-87914

[51] Int. Cl.$^5$ .............................................. G06F 13/00
[52] U.S. Cl. .................................. 364/200; 364/282.1; 364/285; 364/285.1 364/285.2
[58] Field of Search ... 364/200 MS File, 900 MS File

[56] References Cited

U.S. PATENT DOCUMENTS

| | | | |
|---|---|---|---|
| 4,020,466 | 4/1977 | Cordi et al. | 364/200 |
| 4,044,337 | 8/1977 | Hicks et al. | 364/200 |
| 4,077,059 | 2/1978 | Cordi et al. | 364/200 |
| 4,084,231 | 4/1978 | Capozzi et al. | 364/200 |
| 4,459,658 | 7/1984 | Gabbe et al. | 364/200 |
| 4,507,751 | 3/1985 | Gawlick et al. | 364/900 |
| 4,627,019 | 2/1986 | Ng | 364/900 |

OTHER PUBLICATIONS

C. J. Date, *An Introduction to Database Systems*, vol. I, 4th Edition, 1986, pp. 411–419.
Gray et al., *The Recovery Manager of the System R Database Manager*, Computing Surveys, vol. 13, No. 2, Jun. 1981, pp. 224–242.
Severance et al, *Differential Files: Their Application to the Maintenance of Large Databases*, ACM Transactions of Database Systems, vol. 1, No. 3, Sep. 1976, pp. 256–267.
Lorie, "Physical Integrity in a Large Segmented Database", Assocation for Computing Machinery, Mar. 1977, pp. 91–104.

Primary Examiner—Gary V. Harkcom
Assistant Examiner—Michael A. Jaffe
Attorney, Agent, or Firm—Antonelli, Terry, Stout & Kraus

[57] ABSTRACT

There are provided a backup version page table in a storage for providing a correspondence between the pages of a database and the slots in a database storage medium in which the contents of pages to be recovered, if necessary, are stored; a current version page table for providing a correspondence between pages updated by a transaction and slots in the database storage medium wherein the updated contents of the pages are stored; and a journal file for recording various system journals; wherein the updated page contents are stored in the database stored medium at the slots not-used at that time and found with reference to the backup version page table and the current version page table. According to an aspect of another embodiment, there are provided a database constructed of a plurality of sub-areas; a differential file for each sub-area, and a backup file for each sub-area for copying the contents of each sub-area; wherein if the information in a certain sub-area of said database is updated, the updated information is stored in the differential file for the sub-area, and information is recovered using the backup file and the differential file for the certain sub-area.

10 Claims, 12 Drawing Sheets

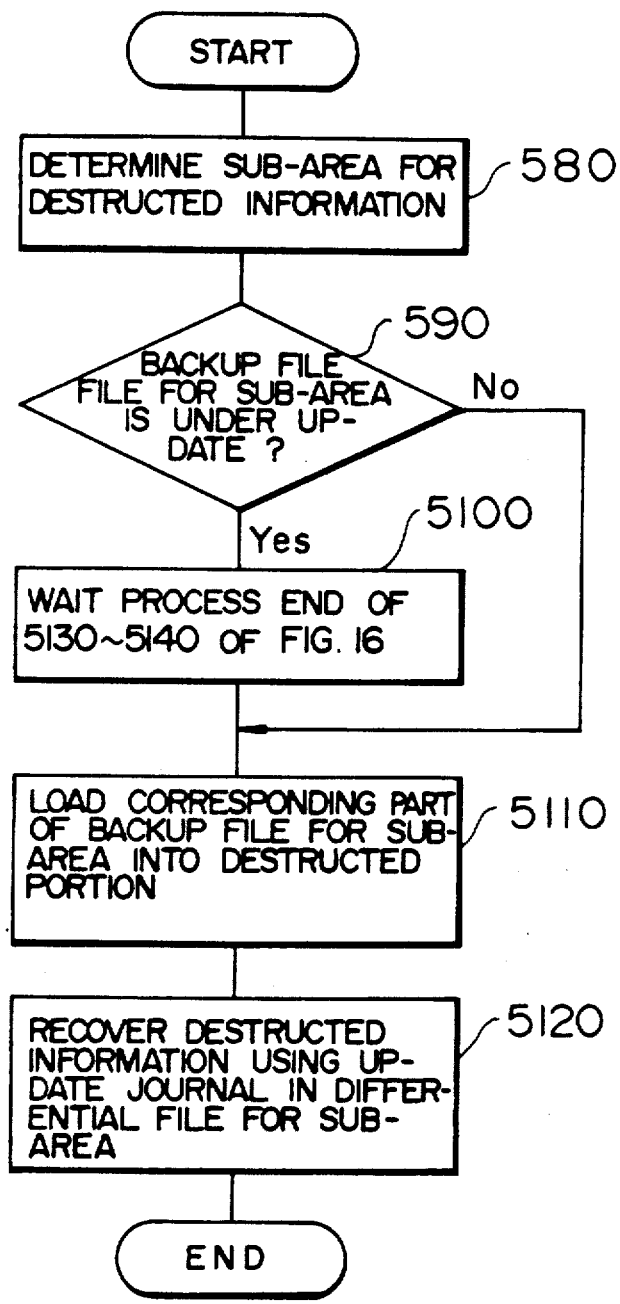

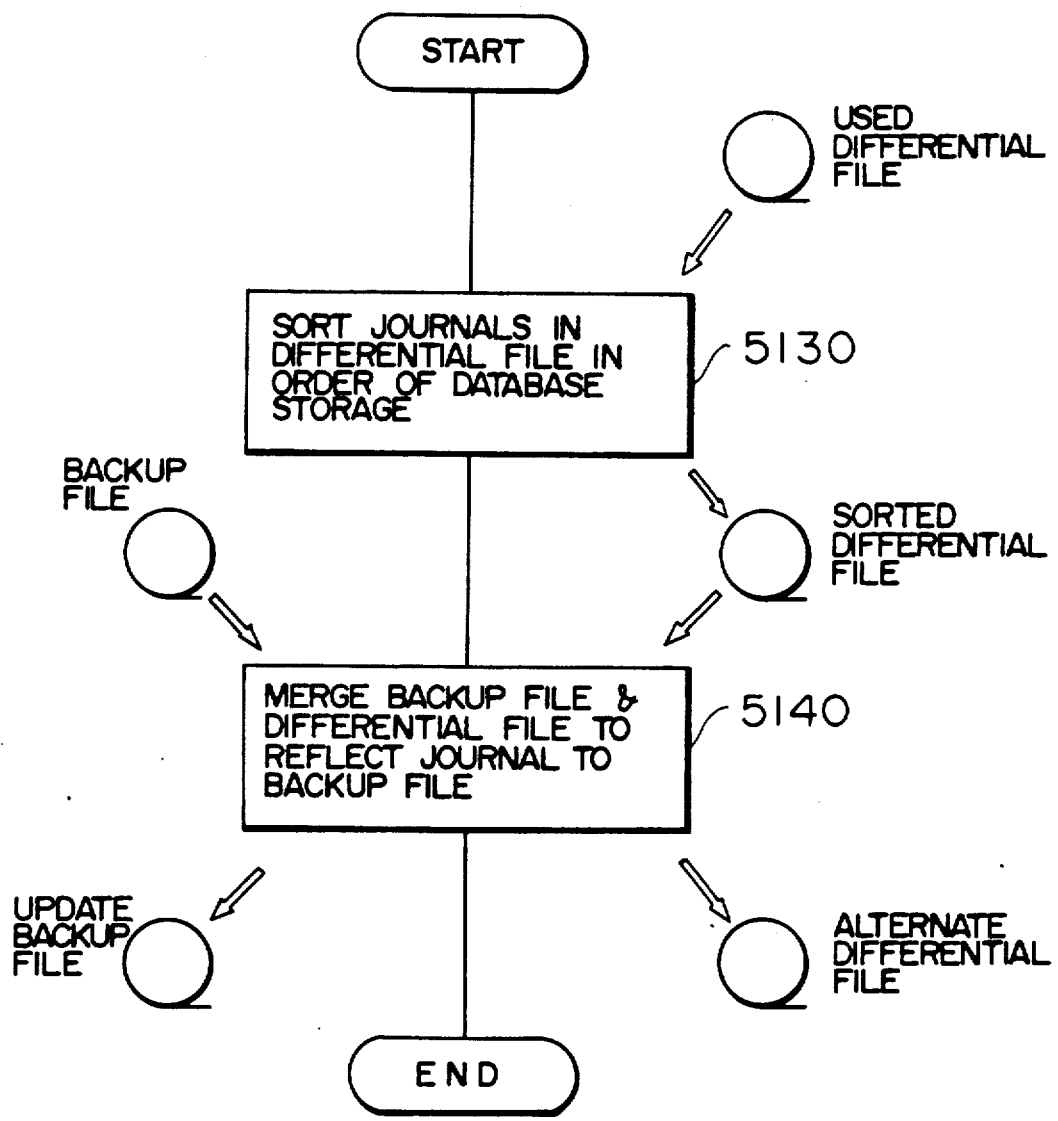

METHOD AND APPARATUS FOR DATABASE UPDATE/RECOVERY

BACKGROUND OF THE INVENTION

The present invention relates to a method and apparatus for update/recovery of a database in a database system which ensures logical integrity for the database to be updated by transactions or subjected to storage medium failure particularly for the database to be recovered after system failure such as power interruption.

Logical integrity for a database in a database system must be retained after system failure such as power interruption or after transaction failure due to program error for example. Specifically, the data base update results obtained by transactions which have not been completed by the time failure occurs, must be invalidated.

As a related prior art, there is known a method of storing update results by a transaction in a new location different from that in which information prior to update was stored. Such a method is described in "ACM Transactions on Database Systems", Vol. 2, No. 1 (1977), pp. 91-104. This method is called a shadow page method wherein before a transaction is completely executed, all the updated database contents are written in new storage locations, and at the time the transaction has been completely executed, information before update is invalidated while information after update is validated. The features of the shadow page method are summarized as in the following (1) to (4):

(1) A database is constructed of pages each constituting a logical area unit. Two page tables including a current version and a backup version are provided, the table indicating a correspondence between pages and slots in the database storage medium in which the contents of pages are stored. The tables are stored in non-volatile medium such as on a disk. The page table itself is usually divided into plural blocks. Transfer between a main storage and the non-volatile medium is executed in units of blocks.

(2) A new slot wherein the update contents by a transaction of a page in a database are stored, is called a current page slot. The correspondence between pages and slots is retained in a current version page table. Whereas a slot wherein the contents prior to update of a page are stored, is called a shadow page slot. The correspondence between pages and slots is retained in a backup version page table.

(3) Upon completion of transaction execution, the current version page table is validated such that update information stored in a current page slot is validated. Particularly, a status bit in the non-volatile medium is changed which indicates an available one of the current and backup version page tables.

(4) When system/transaction failure occurs while executing a transaction, the backup version page table is decided as valid by the status bit. That is, the information before update stored in the shadow page slot identified by the backup version page table is made valid.

Therefore, it is possible to retain logical integrity, even when system/transaction failure occurs. In addition, it is unnecessary to fetch database update journal information.

The following three problems are known in the prior art shadow page method.

The first problem is that a plurality of transactions cannot share and update the database at the same time. The reason for this is that since status bits are changed collectively for validating the current version page table after completing transaction execution, it is necessary that pages being updated by other transactions should not be included in the page table concerned.

The second problem is that synchronization is difficult between validating the updated results of a database and validating messages transmitted to terminals and the updated results of system management information in the main storage. A transaction generally includes not only database update but also message transmission and system management information update. However, change of status bits according to the prior art concerns only database update. Therefore, when system failure occurs, a fear may arise at a certain timing that only the updated database results are validated, or conversely only the message or system management information update results are validated.

The third problem is that it is necessary to update the page table and status bits in the non-volatile medium for each transaction so that the update overhead becomes one of the reasons deteriorating the system performance.

In an actual system environment where a plurality of on-line transactions share and update the database at the same time, instead of the above-described shadow page method, a shadow method combined with a method wherein a database update journal is fetched, is used in view of the first and second problems described above. This latter method however has a large overhead in storing fetching database update information, and has a fear that the system performance is deteriorated while still incorporating the third problem described above.

Apart from the above prior art, another method has been employed for recovery at the occurrence of database medium failure, wherein a backup copy of the entire data base and a database update journal time-sequentially recording all the update contents of the database, are used. This method is described in "An Introduction to Database Systems", Vol. II, Chapter 1, p. 20, by C. J. Date. According to this method, if information in the database storage medium is destroyed, the backup copy is loaded into the database storage medium, sequentially reflecting to the loaded backup copy the database update journal information after the backup copy was obtained, thus enabling recovery of the information.

The above prior art has the following problems (1) to (4):

(1) Since an update journal regarding the entire database is serially written in a single journal file, the write process becomes a bottle neck and the system performance is deteriorated.

(2) If certain information of the database in the storage medium is destroyed, not only the update journal regarding the information concerned, but also all the database update journal after the backup copy was obtained must be read from the journal file and analyzed. There and the database recovery time becomes very long.

(3) The whole or part of the database must be invalidated while a backup copy is being obtained. This deteriorates availability of the database system, and thus a serious problem arises particularly in the case of a 24-hour operating system or the like.

(4) To avoid the deterioration of availability of the database system as described in (3), frequently obtaining backup copies must be restricted. As the time for obtaining backup copies becomes longer, the storage amount of the database update journal becomes extraordinary.

SUMMARY OF THE INVENTION

It is an object of the present invention to provide a method and apparatus for update/recovery of a database, using a shadow page method or a failure recovery method by a database update journal, wherein a plurality of transactions can update a database or input/output a file at the same time, and wherein the update results of a database and the update results of a message or system management information can be validated in synchronism with each other.

To achieve the above object, the features of the present invention reside in the provision of a database constructed of pages which are logical storage locations of data; a backup version page table in a storage for providing a correspondence between the pages of the database and the slots in a database storage medium in which the contents of pages to be recovered, if necessary, are stored; a current version page table for providing a correspondence between pages updated by a transaction and slots in the database storage medium wherein the updated contents of the pages are stored; and a journal file for recording various system journals; wherein the updated page contents are stored in the database storage medium at the slots not-used at that time and found with reference to the backup version page table and the current version page table, the slots are stored in the current version page table, and the journal record representative of the updated contents of the current version page table is fetched into the journal file prior to completion of the transaction.

According to another embodiment of the present invention, a database is divided into a plurality of sub-areas Backup files each having the content of each sub-area and differential files each having updated information of each sub-area sequentially recorded, are provided to thus make it possible to obtain and analyze in parallel the update journals.

Further, the backup file and the differential file provided for each sub-area are merged together to reflect the contents of the differential file to the backup file at a desired time and update it, thereby enhancing the availability of a database.

BRIEF DESCRIPTION OF THE DRAWINGS

FIGS. 14, 15 and 16 show process flows at database update operation, database failure operation, and backup file update operation, respectively.

DESCRIPTION OF THE PREFERRED EMBODIMENTS

Figure 1:
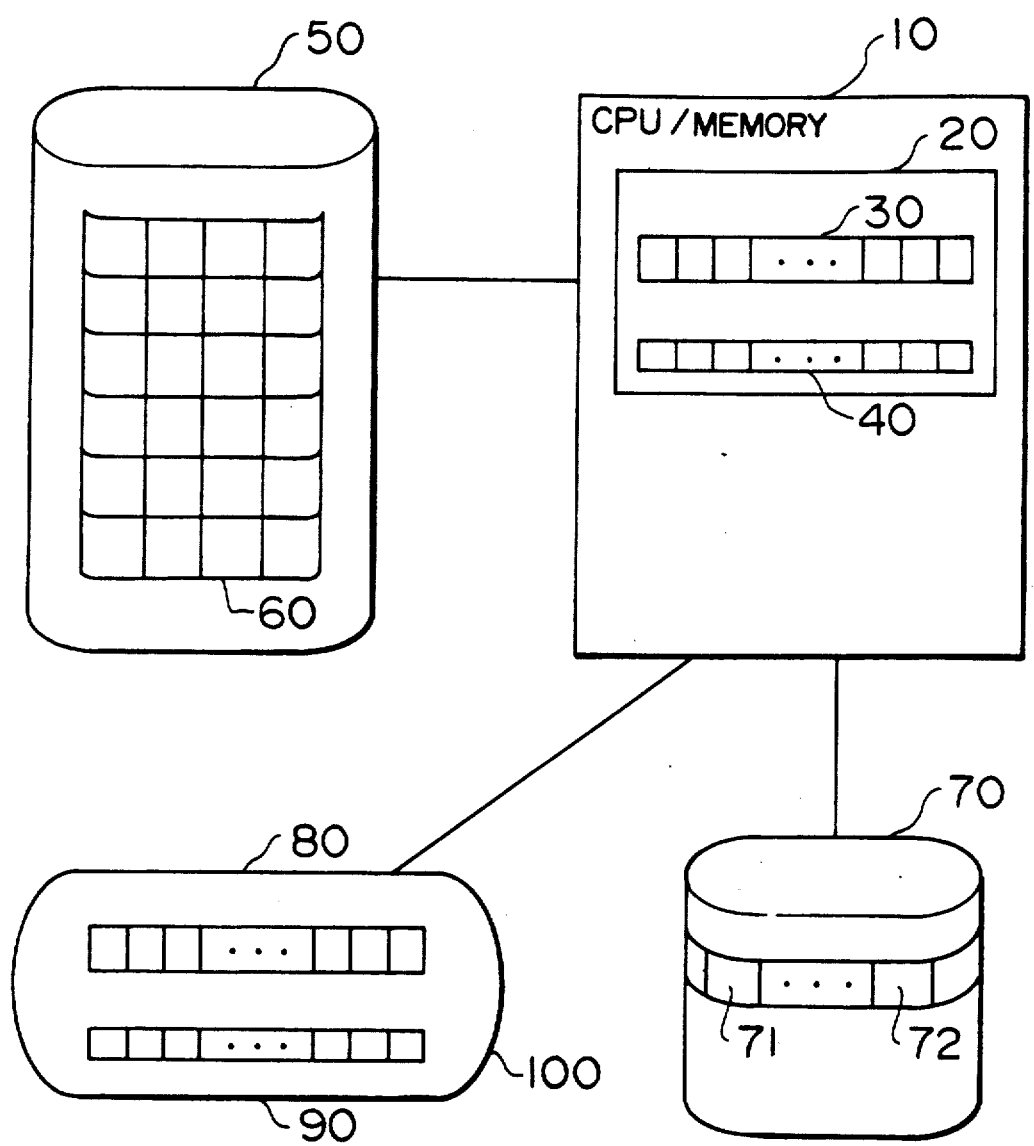
FIG. 1 shows the structure of a first embodiment.

The first and second problems described above in the shadow page method can be solved by storing a page table update journal into a journal file. Namely, (1) The first problem is solved as follows: instead of validating the page table update results by status bits, the page table update results accompanied with update of the database by a transaction are validated by storing the journal indicating a transaction process end. In case of a failure, the page table is recovered using the page table update journal obtained from the journal file.

(2) The second problem is solved by storing into the journal file, the journal indicating a transaction process end, the update contents of a terminal message of system management information in the main storage, and the page table update contents The third problem described above in the shadow page method is solved by executing the update of the page tables in a non-volatile medium not for each transaction but at a checkpoint. In particular, (3) A current version table is provided in the main storage to update this current version page table when the database is updated by a transaction. At a checkpoint, the contents of the current version table are reflected to a backup version page table in the non-volatile medium, or the checkpoint dump of the current version page table is fetched into a checkpoint dump file. Update overhead of the page table in the non-volatile medium is accordingly reduced to thereby solve the third problem.

The operation of the above method will be summarized below:

(1) If the database is updated through execution of a transaction, the current version page table in the main storage is updated, and the slot storing the contents of an updated page is stored. The update journal of the current version page table, together with the journal representing the contents of change by a transaction of a terminal message or system management information in the main storage, is stored into the journal file before the transaction has been completely executed.

(2) When the transaction is executed completely, the journal associated with the transaction and still not fetched is fetched into the journal file. Thereafter, the journal indicating the transaction process end is fetched into the journal file. The transaction is considered as having been completed upon storing the journal so that the database update and the update of a terminal message or system management information in the main storage become validated.

(3) At a checkpoint, the contents of the current version page table in the main storage are written in the backup version page table in the non-volatile medium, or the checkpoint dump of the current version page table is fetched into the checkpoint dump file.

(4) If the checkpoint dumps of the backup and current version page tables are being fetched into the checkpoint dump file when a system failure such as a power failure occurs, the current version page table is restored, using the checkpoint dump in the current version page table and the page table update journal in the journal file, such that only the database update results by the transaction whose journal indicating the process end is already fetched, is reflected.

With the operations (1) and (2), even if a plurality of transactions share the database at a time, the update results of the page table with respect to the database update by each transaction can be validated independently from the other transactions, to thereby solve the first problem.

Further, with the operations (1), (2) and (4), the database the process end, can be validated at a system failure, to thereby solve the second problem.

Furthermore, with the operations (1) and (3), the current version page table in the main storage is updated usually during execution of a transaction, while the backup version page table in the non-volatile medium is updated only at a checkpoint (or the checkpoint dump of the current version table is fetched into the checkpoint dump file), to thereby solve the third problem.

The preferred embodiments of the present invention will be described with reference to the accompanying drawings.

Figure 2:
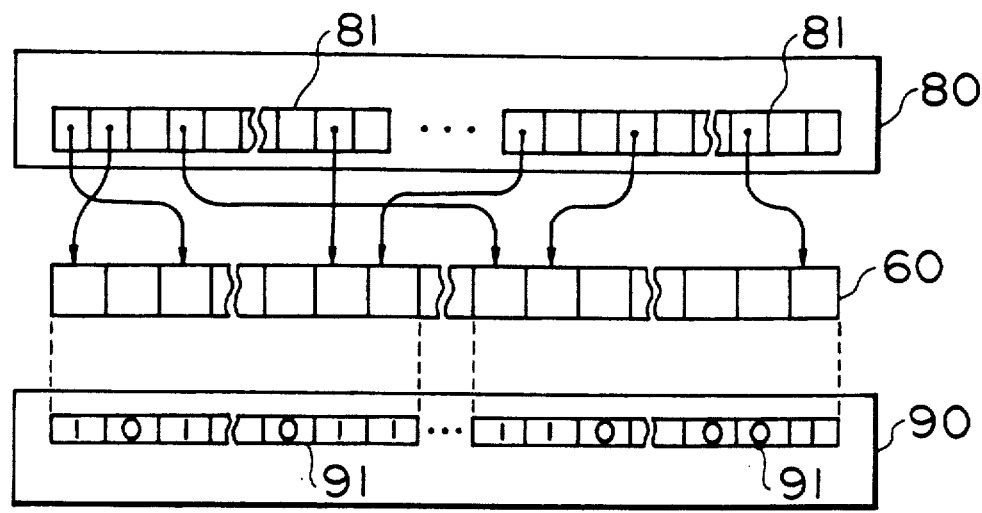
FIG. 2 illustrates the backup version page table and the backup version slot use map according to the present invention.

First, the structure and operation of a first embodiment will be described. FIG. 1 shows the structure of a first embodiment wherein the gist of the present invention is illustrated. Referring now to FIG. 1, connected to a CPU/memory 10 are a database storage medium 50 such as a magnetic disk, a non-volatile storage medium 100 storing database control information such as a backup version page table 80 and a backup version slot use map 90, and a magnetic disk (or magnetic tape) serving as a medium of a journal file 70. The database area 60 in the database storage medium 50 is divided into fixed length blocks called slots. A logical space of the database to be referred to and updated by a transaction is divided into fixed length areas called pages. A slot is used to store the contents of a page, both the slot and the page have the same size (for example, 4096 bytes). Each slot can be referred to or updated by a single input/output operation. FIG. 2 illustrates the backup version page table 80 and the backup version slot use map 90. The backup version page table 80 is updated at a checkpoint to reflect the contents of the current version page table 30 at that time. Particularly, the backup version page table 80 is set with a slot number representative of the storage location in the database area 60 of the latest contents of each page at a latest checkpoint. The backup version slot use map 90 is updated at a checkpoint similar to the case of the backup version page table 80, the backup version slot map 90 being a bit map for indicating use or non-use of each slot in the database 60 in accordance with the current version page table 30 at that time. In particular, in the backup version slot use map 90, 1 is set at the slot storing the latest contents of each page at a latest checkpoint, and 0 is set at the other slots. The backup version page table 80 and the backup version slot use map 90 are constructed of a plurality of fixed length (e.g., 512 bytes) blocks 81 and 91, respectively. Each block can be referred to or updated by a single input/output operation. If a failure occurs while the backup version page table 80 is under a write operation, logical integrity of the database is not ensured. To eliminate this problem, the backup version page table 80 is duplicated such that after a first write operation is completed in a normal manner, a next write operation continues with respect to the other backup version page table. If the first write operation terminates abnormally, the other backup version page table is used to execute a restore process as of an ordinary system failure so that logical integrity of the database system can be ensured. Consequently, in this embodiment, it is assumed that a write operation of the backup version page table 80 is always completed in a normal manner. The backup version page table 80 and the backup version slot use map 90 may be located in the database storage medium 50.

Figure 3:
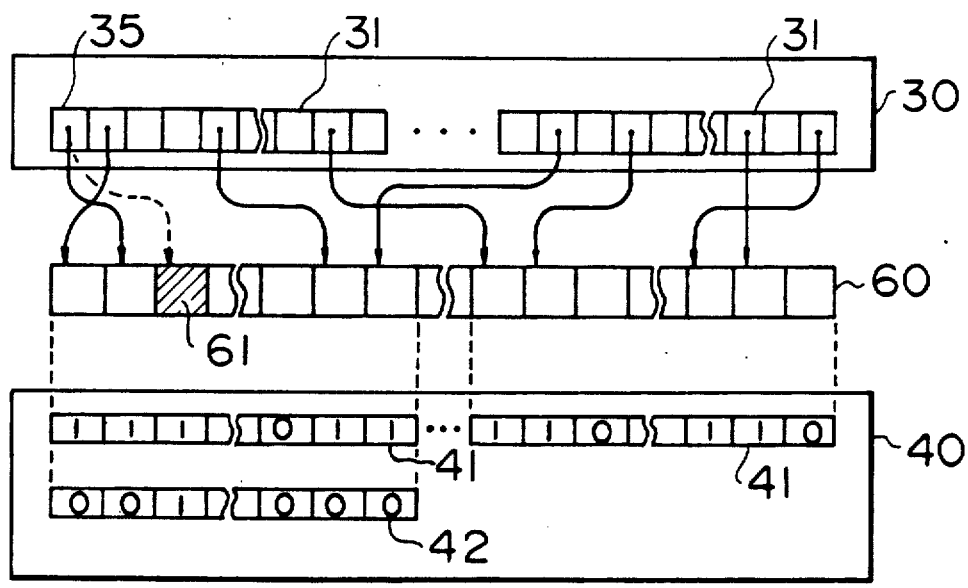
FIG. 3 illustrates the current version page table and the backup version slot use map according to the present invention.

FIG. 3 illustrates the current version page table 30 and the current version slot use map 40. This database control information is in the memory 10 during the system operation. The current version page table 30 is updated when the database is updated by a transaction, and is set with a slot number of the database area 60 in which the updated contents of an updated page are stored. In particular, the current version page table 30 is set with a slot number storing the latest contents of each page of the database at any time during the system operation. The current version page table 30 is constructed of a plurality of fixed length logical blocks 31, corresponding to the backup version page table 80. In this embodiment, the memory 10 is assumed to be capable of loading the whole of the current version page table 30. In the case where this assumption is not permitted, the blocks of the current version page table 30 except those blocks including the whole of the page updated by a transaction under execution, are written in a storage (volatile one may be used) other than the memory (main storage) by using an LRU algorithm or the like. Thus, the whole of the current version page table 30 can be considered as substantially in the memory 10. On the other hand, the current version slot use map 40 is updated at the time of updating the database by a transaction and at the time of completing a transaction execution. The current version slot use map 40 indicates use or non-use of each slot in the database area 60 at any time during the system operation. The current version slot use map 40 is constructed of a plurality of fixed length logical blocks 41, corresponding to the backup version slot use map 90. As different from the backup version slot use map 90, for the current version slot use map 40 not only the slot storing the latest contents of each page in the data base, but also the slot 61 (called a shadow slot) storing the contents of the page prior to update by a transaction under execution is made usable. For the block including the entry corresponding to a shadow slot, there are provided an ordinary block 41 indicating the slot use status and a block 42 indicating if each slot is a shadow slot or not.

Figure 4:
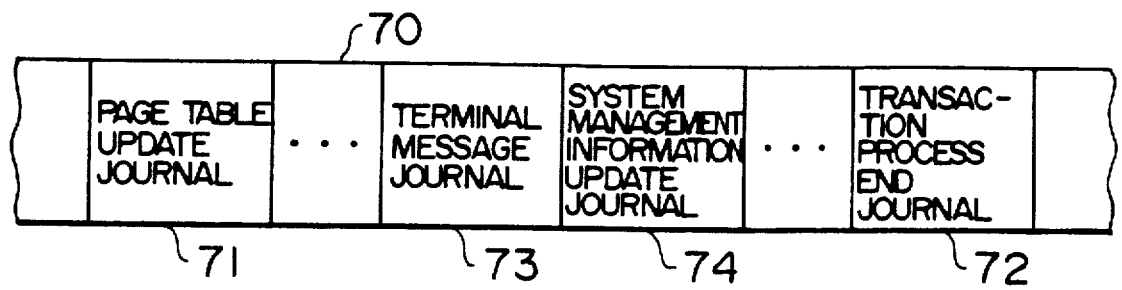
FIG. 4 illustrates the journal file according to the present invention.

FIG. 4 illustrates the journal file 70 wherein various system journals are fetched, such as a page table update journal 71, a transaction process end journal 72, a terminal message journal 73, and a system management update journal 74. The page table update journal 71 contains the information such as an update page number, a slot number storing the contents of the page prior to update, and a slot number storing the contents of the page after update.

Next, the system operation will be described. In the following description, the system operation is classified into a normal operation, a checkpoint operation, a system failure operation, and a transaction failure operation.

(1) Normal Operation

The processes according to the present invention are performed in the order of (a) to (b) from the start to the end of a transaction execution.

(a) Page Read during Execution

The entry of a page is searched in the current version page table 30 to find a slot number storing the latest contents of the page. The page is read from the obtained slot.

(b) Update Page Write during Execution

Figure 5:
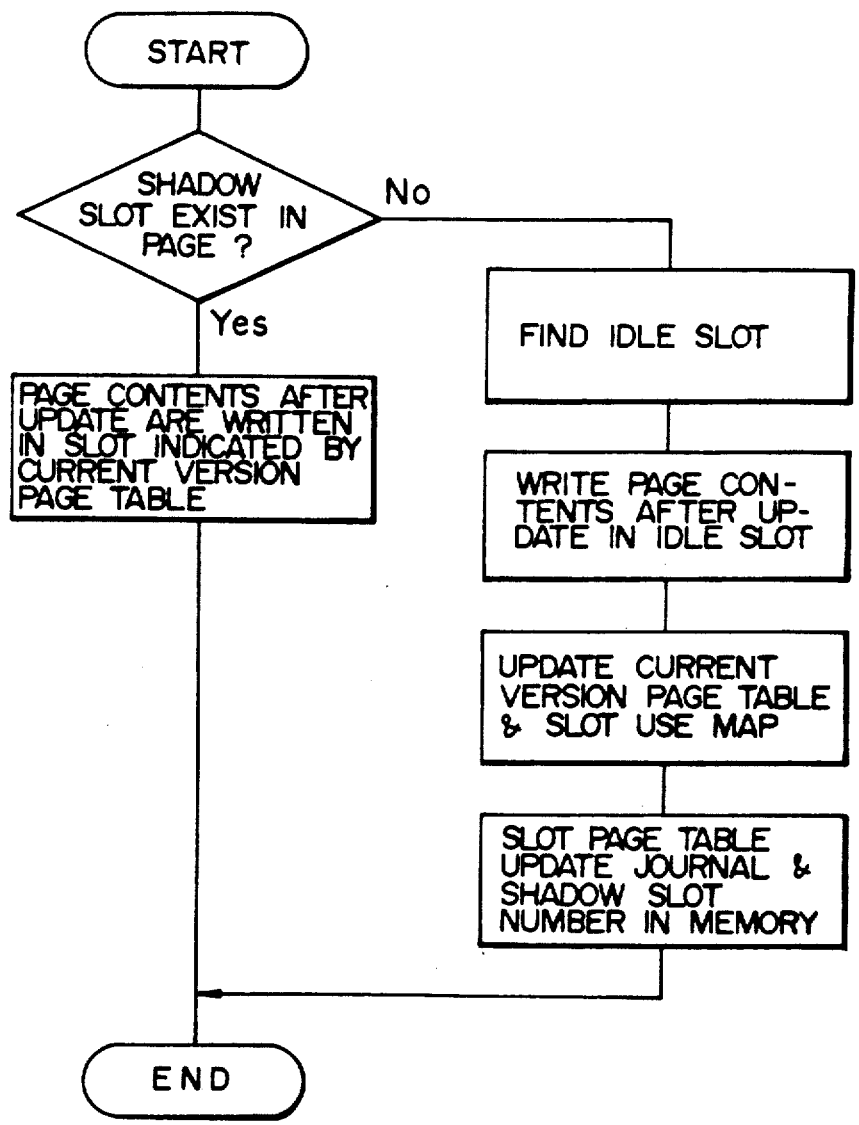
FIG. 5 shows a process flow for writing an update page according to the present invention.

A process flow is shown in FIG. 5 wherein an update page is written in the database area 60 of the database storage medium 50.

① First, the shadow slot of the page is checked to see if it exists. The existence of the shadow slot of the page can be checked based on the information on the shadow slot stored in the memory 10 to be later described.

② If the shadow slot of the page exists at ①, the page has been already written more than once in the database by transactions. In this case, the entry of the page is searched in the current version page table 30, and the contents of the update page are written in the obtained slot.

③ If the shadow slot of the page does not exist at ①, the page is now first written in the database by a transaction. In this case, the contents of the update page are written in a new slot by way of the following procedure, and an old slot is made a shadow slot.

ⓐ An idle slot is searched in the current version slot use map 40.

ⓑ The contents of the update page are written in the idle slot.

ⓒ The entry of the page in the current version page table is updated to set the number of the new slot. Further, the current version slot use map 40 is updated to make the new slot usable, and the slot storing the contents of the page prior to update is made a shadow slot.

ⓓ The page table update journal, including the page number and the slot numbers storing the contents of before and after update, is stored in the memory 10. The fact that a shadow slot exists for the page, and the shadow slot number, are stored in the memory 10.

(c) Update Page Write upon Issuance of Commit Command

The process (b) is executed, for example, when the database page storage area of the memory 10 overflows. The present process (c) is a process for writing all the pages updated by a transaction into the database when a program executed by the transaction issues a commit command indicating a transaction process end. The contents of this process are nothing more than executing the process (b) for each page. If a system failure occurs during execution of this process, the transaction is considered as not completed so that the database update results are not considered as valid.

(d) Fetching Page Table Update Journal

The page table update journal stored in the memory 10 is fetched in the journal file 70 as a page table update journal 71.

The output to an actual medium is performed, together with other journals such as the terminal message journal 73 and the system management information update journal 74, either at the time of fetching a transaction process and journal at (f) or at the time when the journal storage area of the memory 10 overflows.

(e) Update of Current Version Slot Use Map

Based on the shadow slot management information stored in the memory 10 at the process (b), the slot of the update page by a transaction is released and made an idle slot. Particularly, the current version slot use map 40 is searched for each shadow slot such that the bit indicating the use or non-use of the slot and the bit indicating if the slot is a shadow slot, are both turned off.

(f) Fetching Transaction Process End Journal

After the process (e), the transaction process end journal 72 indicating the transaction process end is fetched into the journal file 70.

As described at (d), in this process, among various journals associated with the transaction those journals still not outputted are outputted to the medium of the journal file 70 together with the transaction process end journal.

(2) Checkpoint Operation

Checkpoints are set at the following timings for various reasons such as shortening the time required for recovery process at occurrence of a system failure.

at the process end of system start/re-start
at the system end
at the time when a certain number of journals are fetched after a preceding checkpoint
at other timings (such as at a journal file medium failure)

The process associated with the database at a checkpoint is performed in the order of the following (a) to (b):

(a) Fetching Page Table Update Journal

The page table update journal stored in the memory 10 is fetched into the journal file 70 as a page table update journal 71 (outputted to a medium, as different from the case of (d) of normal operation (1)).

(b) Update of Backup Version Page Table and the Like

The backup version page table 80 and the backup version slot use map 90 in the non-volatile storage medium 100 are updated to reflect the contents of the current version page table 30. The contents of the current version page table 30 per se are simply written into the backup version page table 80. Written into the backup version slot use map 90 is the Exclusive-ORed results of the bit map block 41 indicating the use or non-use of a slot and the bit map block 42 indicating if there exists a shadow slot or not, respectively of the current version slot use map 40.

Each block of the current version page table 30 and the current version slot use map 40 is provided with an update flag for indicating if there is an update after the preceding checkpoint. Thus, it is possible to reduce the amount of updating by writing only the necessary block into the backup version page table 80 and the backup version slot use map 90, respectively in the non-volatile storage medium 100.

As checkpoint information, the last journal number (serial number given to each journal) in the journal file during the time when the backup version page table 80 is updated, and the first journal number (serial number given to each journal) among all the transactions under execution at a checkpoint, are fetched into the non-volatile storage medium 100 together with the backup version page table 80.

During execution of the processes (a) and (b), the transaction may be under execution. However, the database cannot be updated and the transaction requesting a database update becomes in a wait state.

The checkpoint information at the process (b) is usually fetched into a file storing various informations to be used in a recovery process at a system failure, under a system environment having a recovery object such as a database, a message, and a system management information.

(3) System Failure Operation

Figure 6:
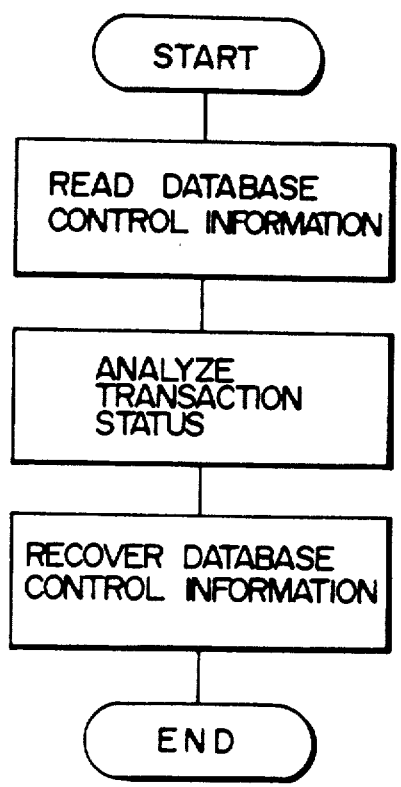
FIG. 6 shows a process flow for database recovery at system failure according to the present invention.

A database recovery process when a system failure such as a power failure occurs will now be described. The process flow is shown in FIG. 6. After executing the following processes (a) to (c), the system reads a necessary page using the current version page table 30 and starts executing a normal process.

(a) Database Control Information Read

The backup version page table 80 and the backup version slot use map 90 are read out of the non-volatile storage medium 100 to develop them into the memory 10 as the current version page table 30 and the current version slot use map 40, respectively. Until the normal process starts after the end of a recovery process at a system failure, the current version slot use map 40 contains only the bit map block 41 indicating the use and non-use of a each slot, and the bit map block 42 indicating if there exists a shadow slot is not contained.

(b) Transaction Status Analysis

Figure 7:
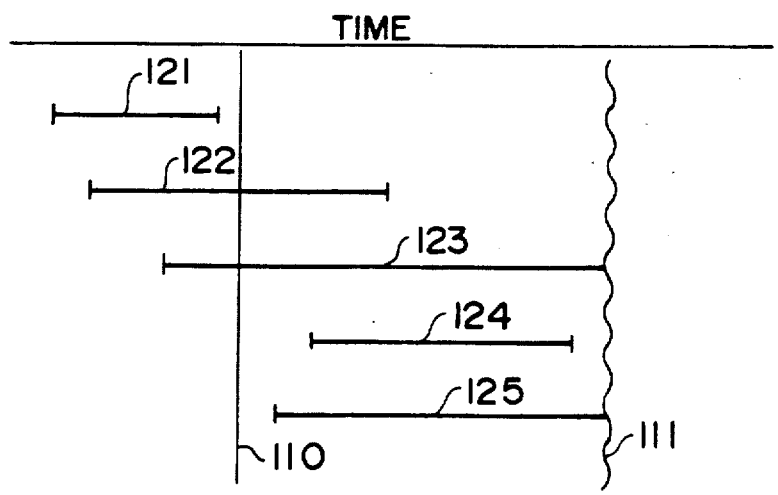
FIG. 7 is a view showing an example of the status of transactions.

The transaction status at a system failure is analyzed reading the journal file 70. Transactions are classified in accordance with the analyzed results. Transactions are classified into the following ① to ⑤ depending on the necessary recovery process contents. In FIG. 7, reference numeral 110 represents a checkpoint, 111 a system failure occurrence instant, 121 to 125 transactions.

① Transaction Type I

A transaction completed before a checkpoint as shown by a transaction 121. The completion of a transaction is judged if a transaction process end journal has been obtained or not.

② Transaction Type II

A transaction started before a checkpoint and completed after the checkpoint as shown by a transaction 122.

③ Transaction Type III

A transaction started before a checkpoint and being executed at the time of a system failure occurrence as shown by a transaction 123.

④ Transaction Type IV

A transaction stated after a checkpoint and completed before a system failure occurrence as shown by a transaction 124.

⑤ Transaction Type V

A transaction started after a checkpoint and being executed at the time of a system failure occurrence as shown by a transaction 125.

As described later, a database recovery process is not needed for transaction type I. Therefore, the range of journals to be analyzed at the database recovery process is those journals including the first and succeeding ones of all the transactions under execution at a checkpoint. The numbers of these journals have been written in the non-volatile storage medium 100 together with the last journal number at the time of the checkpoint so that the numbers can be written in the memory 10 at the start of the recovery process.

(c) Database Control Information Recovery

The recovery process is conducted in accordance with the transaction Types shown in (b).

① For Transaction Type I

All the processes by this transaction are valid. The database update results by the transaction have already been validated so that a database recovery process is not necessary.

② For Transaction Type II

Although all the processes by this transaction are valid, there is a possibility that a part of the database update results by the transaction is not validated. Therefore, using the page table update journal 71 of the journal file 70 associated with the transaction, the database update results associated with the transaction and not validated are reflected to the database control information 20 in the memory 10. Particularly, page table update journals fetched after a checkpoint of the transaction are read sequentially in the fetch order to update the current version page table 30 and the current version slot use map 40. As to the current page table 30, the entry of the page is searched and the slot number after update is set. As to the current slot use map 40, the entry of each slot before and after update is searched, to turn it off and on, respectively.

③ For transaction Type III

All the processes by this transaction are invalid. However, there is a possibility that a part of the database update results will be validated. Therefore, using the page table update journal 71 of the journal file 70 associated with the transaction, the validated database update results associated with the transaction are removed from the database control information 20 in the memory 10. Particularly, page table update journals 71 fetched before a checkpoint of the transaction are read in the reverse-fetch order to update the current version page table 30 and the current version slot use map 40. As to the current page table 30, the entry of the page is searched and the slot number before update is set. As to the current version slot use map 40, the entry of each slot before and after update is searched to turn it on and off, respectively.

④ For Transaction type IV

All the processes by this transaction are valid, whereas the database update results of the transaction are not validated. Therefore, using the page update journal of the journal file 70 associated with the transaction, the database update results of the transaction are reflected to the database control information 20 in the memory 10. The process contents are the same as in the case of ② For Transaction Type II, except that all the page table update journals 71 associated with the transaction are used.

In case where there are a plurality of transactions of this Type, the above process is conducted in the fetch order of transaction process end journals.

⑤ For Transaction Type V

All the processes by this transaction are invalid. The database update results by the transaction are not validated so that the database recovery process is not needed.

The recovery process for a message or system management information other than the database is conducted in a known manner by analyzing the journal file 70.

(4) Transaction Failure Operation

The following recovery process is performed if a transaction failure such as a program error occurs before the transaction process end journal 72 is fetched.

(a) Database Control Information Recovery

Using the shadow slot management information stored in the memory 10, the following processes ① and ② are executed for all the updated pages associated with the transaction.

① The page entry of the current version page table 30 is searched to set a slot number before update.

② The current version slot use map 40 is searched to turn off the bit indicating the use and non-use of the slot of the page after update as well as the bit indicating if the slot of the page before update is a shadow slot.

(b) page Content Recovery in Memory

In transferring the page loaded in the memory 10 between different transactions, the information before update associated with the transaction is left in the memory 10. Using the left information, the contents of the page are recovered to have the contents at the start of the transaction.

The recovery process for a message or system management information is conducted in a known manner using the journal file 70.

As stated above, the present embodiment can solve the three problems accompanied with the shadow page method described previously. According to a first effect peculiar to the present embodiment, it is not required to be in a system stop state but the system may be under execution of a transaction at a checkpoint (in case of a transaction requesting a database update, it becomes in a wait state), thus leading to a small overhead of a checkpoint process. According to a second effect, the first journal number among all the transactions under execution at a checkpoint is recorded in a non-volatile storage medium so that the range of journals to be analyzed in connection with the database in the recovery process at a system failure occurrence becomes narrow, thus shortening the time required for a recovery process. Further, system management information or the like in the memory 10 is written in a non-volatile storage medium at a check point to perform at a system failure a recovery process using the written information. Thus, the range of journals to be analyzed in connection with the database and the like becomes also narrow, thus further shortening the time required for a recovery process.

If a database recovery process at a system failure occurrence is not performed for each transaction as in the above embodiment but is performed as in the following ① to ②, a recovery process can be performed efficiently, together with a transaction status analysis or a recovery process for a message or system management information.

① First, the journal file 70 is read starting from the last journal in the reverse-fetch order to invalidate the transaction status analysis and the processes by the transactions not completed.

② Next, the journal file 70 is read in the fetch order to validate the processes by the transactions completed.

Figure 8:
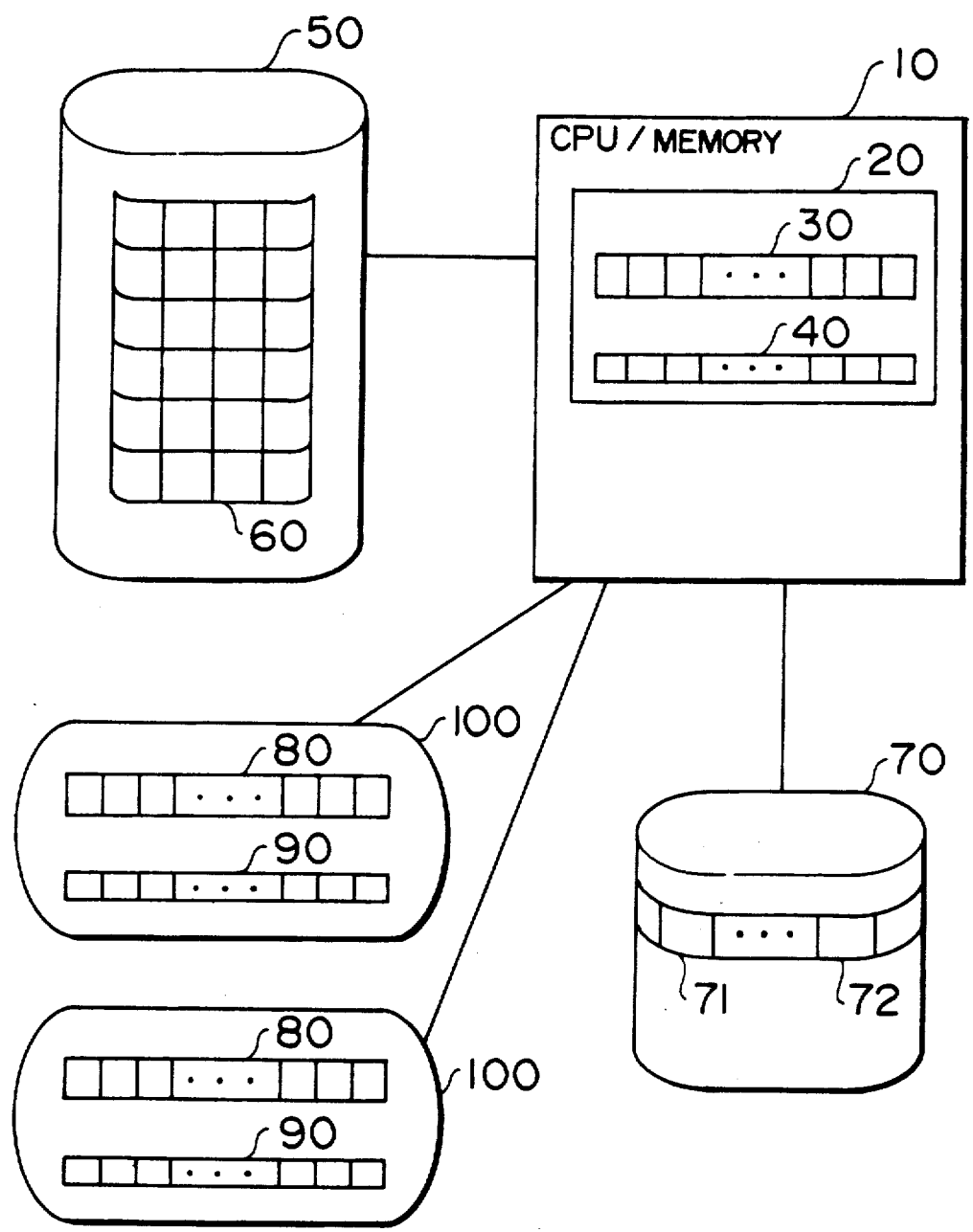
FIG. 8 shows the structure of a second embodiment of the present invention.

Next, the structure and operation of a second embodiment will be described. FIG. 8 shows the structure of the second embodiment. This embodiment is basically the same as the first embodiment. The difference from the first embodiment is that database control information is duplicated on the non-volatile storage medium 100 each constructed of the backup version page table 80 and the backup version slot use map 90. Two pairs of the database control information are stored in the separate non-volatile storage medium 100 as shown in FIG. 8, but these pairs may be stored in the same non-volatile storage medium (or may be in the database storage medium 50). Two pairs of the backup version page table 80 and the backup version slot use map 90 are alternately updated at a checkpoint. The pair updated at a latest effective checkpoint is used in the recovery process at a system failure occurrence. To this end, an area is provided in the non-volatile storage medium 100 wherein the last journal number in the journal file 70 at the update of the backup version page table 80, as well as a checkpoint valid flag indicating the validity of the checkpoint, is stored as checkpoint information similar to the case of the first embodiment. Each backup version page table 80 is not needed to be duplicated as is different from the first embodiment.

The system operation will now be described. The normal operation and the transaction failure operation are performed in the same manner as with the first embodiment. Therefore, the following description will be directed to the checkpoint operation and the system failure operation.

(1) Checkpoint Operation

Figure 9:
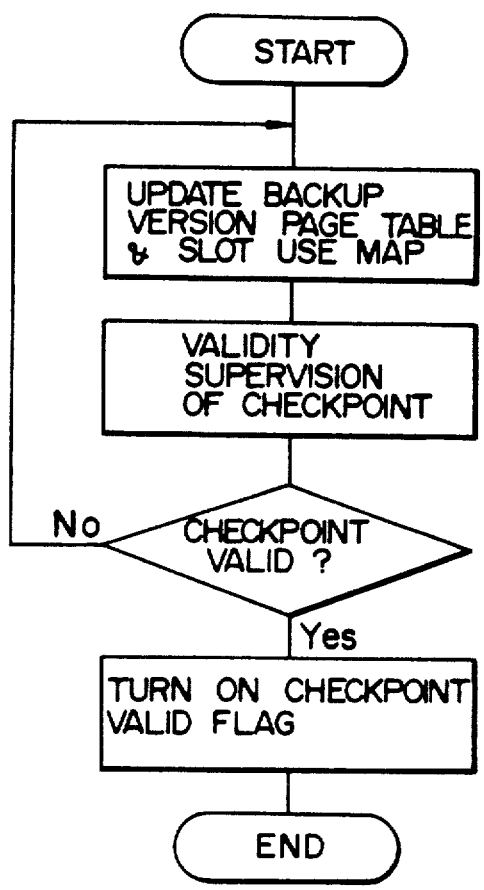
FIG. 9 shows a process flow at a checkpoint according to the second embodiment of this invention.

A process associated with the database at the checkpoint operation will be described. The process flow is shown in FIG. 9.

(a) Update of Backup Version Page Table and the Like

A necessary update process is performed selecting the backup version page table 80 and the backup version slot use map 90 to be updated at a checkpoint. The backup version page table and the like to be updated are selected at a start/re-start of the system operation and thereafter, they are updated at each effective checkpoint. The update process for the selected backup version page table 80 and the backup version slot use map 90 is performed in a same manner as the first embodiment. However, it is necessary to provide an update flag at each backup version page table 80 and at each backup version slot use map 90.

The last journal number at the update of the backup version page table 80 is fetched into the non-volatile storage medium 100 as checkpoint information, and the checkpoint valid flag in the non-volatile storage medium 100 is turned off (made invalid).

While executing the above process, the database may be updated and the transaction may be under execution.

(b) Checkpoint Validity Supervision

Figure 10:
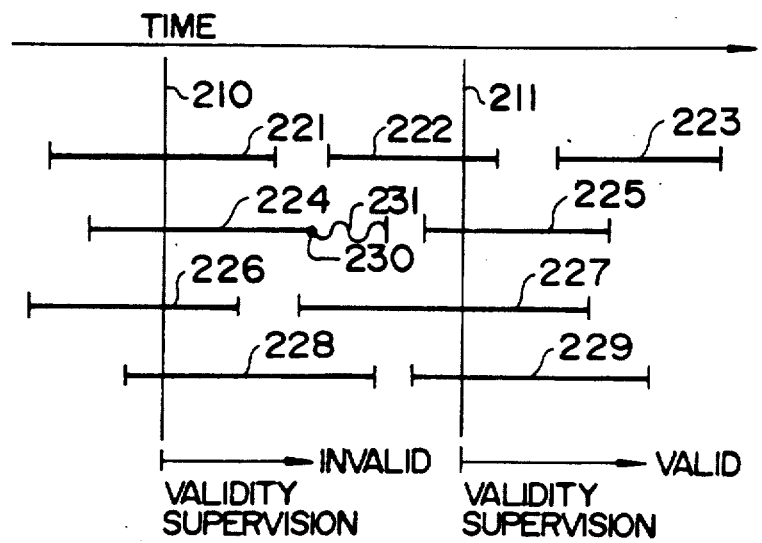
FIG. 10 illustrates validity supervision of a checkpoint according to the present invention.

The execution conditions of all the transactions at a checkpoint are supervised to effect validity supervision of the checkpoint. FIG. 10 illustrates the validity supervision of a checkpoint. In the Figure, reference numerals 210 and 211 represent checkpoints, 221 to 229 represent transactions, 230 represents a transaction failure, 231 represents a recovery process for the transaction failure. All the transactions 221, 224, 226 and 228 under execution at the checkpoint 210 become the objects of checkpoint validity supervision. The checkpoint becomes invalid because of occurrence of the transaction failure 230. In this case, after the recovery process 231 for the transaction failure 230, a checkpoint 211 is then set whereas all the transactions 222, 225, 227 and 229 under execution at the checkpoint 211 become the objects of checkpoint validity supervision. After process and of the transaction 229, the checkpoint 211 becomes valid.

(c) Update of Checkpoint Valid Flag

If the checkpoint validity supervision results in a valid checkpoint, a checkpoint valid flag in the non-volatile storage medium 100 is turned on (made valid).

(2) System Failure Operation

The database recovery process at a system failure such as a power failure is basically performed in the same manner as with the first embodiment, however, there is a slight difference as in the following. After executing the following processes (a) to (c), the system reads the necessary page using the current version page table 30 to start a normal operation.

(a) Database Control Information Read

After selecting the backup version page table 80 and the backup version slot use map 90 to be first read, the read process for these is performed in the same manner as with the first embodiment. The selection of the objects to be read is performed in the following manner:

① Each checkpoint valid flag and the last journal number in the journal 70 at the update of the backup version page table 80 are read from each non-volatile storage medium 100.

② In case that the checkpoint valid flags are both turned on (made valid), the last journal numbers at the update of the backup version page table 80 are compared with each other to make the new one as an object to be read.

③ In case that one of the checkpoint valid flags is turned on, the turned-on side is made an object to be read. There is no case where both the checkpoint valid flags become turned off because of the operation at a checkpoint. The backup version page table 80 and the backup version slot use map 90 not selected in the selection process become the objects to be updated at the next checkpoint. The corresponding update flags are all turned on.

(b) Transaction Status Analysis

The analysis is performed in the same manner as with the first embodiment by reading the journal file 70. In this embodiment, transactions Type III do not exist due to the checkpoint validity supervision, and recovery process is those journals including the last journal at a checkpoint and the succeeding journals.

(c) Database Control Information Recovery

The same process as with the first embodiment is performed, except that transactions Type III do not exist.

The recovery process for a message and system management information and the like is performed in a known manner by analyzing the journal file 70.

As described so far, the present embodiment can solve the three problems accompanied with the shadow page method described above, similar to the first embodiment. According to a first effect peculiar to the present embodiment, it is not required to be in a system stop state but the system may be under execution of a transaction including a database update, at a checkpoint, thus leading to a further small overhead of a checkpoint process than that of the first embodiment. According to a second effect, the range of journals to be analyzed in connection with the database for the recovery process at a system failure occurrence are those journals including the last journal at the checkpoint and the succeeding journals, thus further shortening the time required for the recovery process. Further, using a similar method as with the database control information in the memory such as the system management information or the like results in a further short time required for the recovery, similar to the first embodiment.

Figure 11:
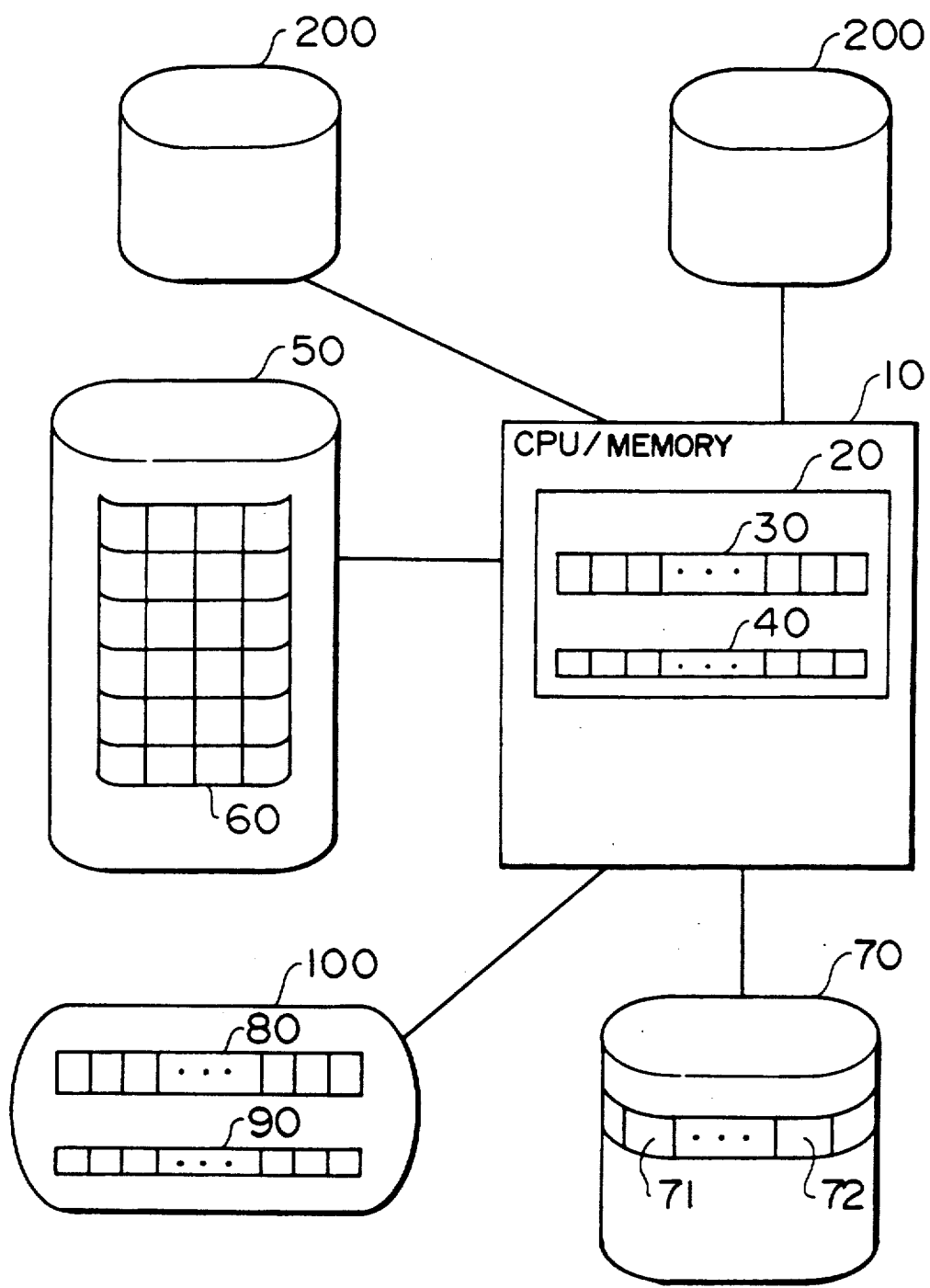
FIG. 11 shows the structure of a third embodiment of the present invention.

Next, the structure and operation of a third embodiment will be described. FIG. 11 is a view showing the structure of the third embodiment. In this embodiment, a plurality of checkpoint dump files 200 are added to the elements of the first embodiment and connected to the CPU/memory 10. The checkpoint dump file 200 is a file in which system management information and database control information in the memory 10 are written and used in accordance with a round robin scheme. Particularly, each checkpoint dump file is sequentially used for each checkpoint. After all of the checkpoint dump files have been used once, the checkpoint dump file at the top is again cyclically used. In this case, new checkpoint dump information is written so as not to erase the information written previously (which is called checkpoint dump information). In a recovery process at a system failure, the checkpoint dump information fetched at the latest, effective checkpoint is used. To this end, in the checkpoint dump file 200, the last journal number in the journal file 70 at an effective checkpoint is included as checkpoint information, together with checkpoint dump information such as system management information and database control information 20 in the memory 10. The backup version page table 80 is not needed to be duplicated similar to the case of the second embodiment.

Next, the operation of the system will be described. The normal operation and the transaction failure operation are performed in the similar manner to the first embodiment. The following description is therefore directed to the checkpoint failure operation and the system failure operation.

(1) Checkpoint Operation

Figure 12:
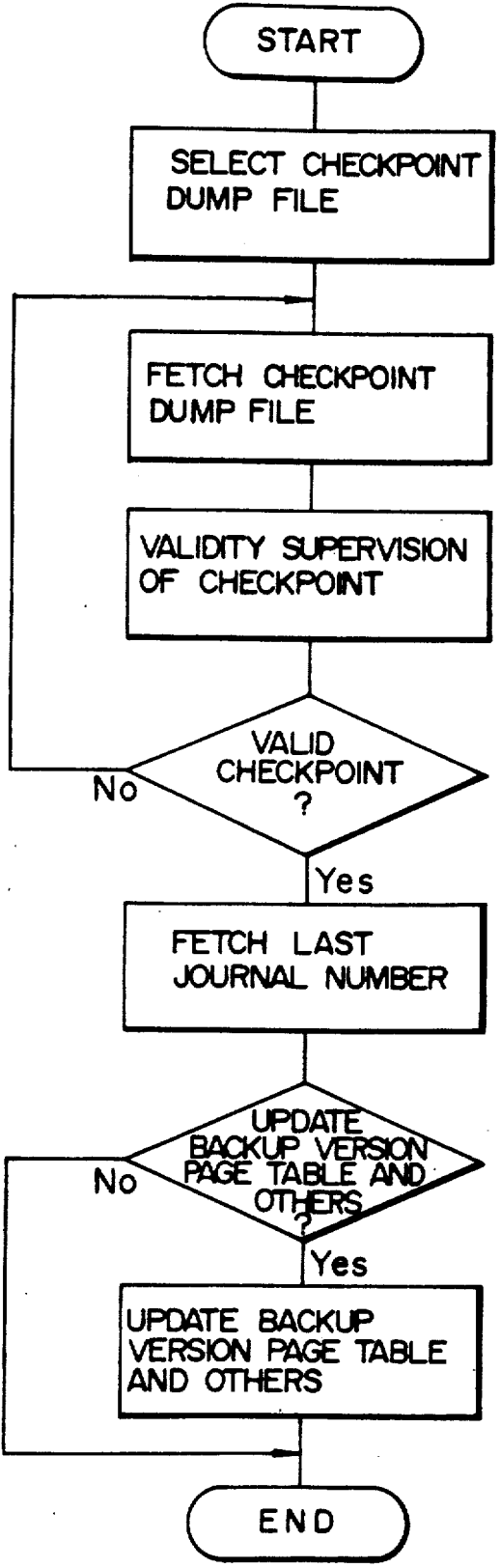
FIG. 12 shows a process flow at a checkpoint according to the third embodiment of this invention.

A process flow at a checkpoint is shown in FIG. 12.

(a) Checkpoint Dump File Selection

A checkpoint dump file 200 is selected which fetches checkpoint dump information. The checkpoint dump file 200 to which checkpoint dump information is fetched is selected at a system start/re-start time and thereafter, and used in accordance with a round robin scheme.

(b) Checkpoint Dump Information Fetch

The information such as system management information and database control information in the memory 10 is fetched into the selected checkpoint dump file 200. As to the database control information 20, only the portion updated after the latest update process for the backup version page table 80 and the backup version slot use map 90 is fetched in units of blocks as checkpoint dump information. To this end, an update flag is provided for each block of the current version page table 30 and the current version slot use map 40.

(c) Checkpoint Validity Supervision

A checkpoint is subject to validity supervision similar to the second embodiment. If a checkpoint is determined as invalid, a new checkpoint is again checked. In this case, new checkpoint dump information is fetched into the same checkpoint dump file 200, overwriting upon the invalid checkpoint dump information.

(d) Fetching Last Journal Number

If the checkpoint supervision results in an effective checkpoint, the last journal number in the journal file 70 at the checkpoint is fetched into the checkpoint dump file 200. The checkpoint dump information is made valid by this process.

(e) Update of backup Version Page Table and the Like

To reduce the fetch amount of checkpoint dump information, the backup version page table 80 and the backup version slot use map 90 are updated at a predetermined number of effective checkpoints, and the update flags are turned off.

(2) System Failure Operation

The database recovery process at a system failure occurrence is performed in the order of the following processes (a) to (d). After executing the processes (a) to (d), the system reads a necessary page using the current version page table 30 to start a normal process.

(a) Database Control Information Read

Similar to the first embodiment, the backup version page table 80 and the backup version slot use map 90 are read from the non-volatile storage medium 100 to develop them into the memory 10 as the current version page table 30 and the current version slot use map 40, respectively.

(b) Checkpoint Dump Information Read

The checkpoint dump information in the database control information 20 is read from the checkpoint dump file 200 to overwrite it upon the corresponding blocks of the current version page table 30 and the current version slot use map 40 to thereby recover the database control information 20 in such conditions as a state at the checkpoint. Selection of the checkpoint dump file 200 to be read is performed as follows:

① The last journal number for the last checkpoint dump information is read from each checkpoint dump file.

② The read-out numbers are compared with each other to make the checkpoint dump information for the latest number as an object to be read. The checkpoint dump information which has no last journal number is invalid so that it does not become an object to be read.

(c) Transaction Status Analysis

The analysis is performed in a similar manner to the second embodiment.

(d) Database Control Information Recovery

The recovery is performed in a similar manner to the second embodiment.

The recovery process for a message and system management information or the like is performed in a known manner using the journal file 70 and the checkpoint dump file 200.

As stated so far, similar to the first and second embodiments, the present embodiment can solve the three problems accompanied with the shadow page method described above. Further, similar effects to the second embodiment can be attained as the effects peculiar to this embodiment.

As seen from the foregoing description, high speed operation and superior availability of the non-volatile storage medium can advantageously be achieved when a high speed random access storage such as an IC non-volatile memory or a so-called IC disk is used as the non-volatile storage medium.

In the above embodiments, a detailed description has been given for a recovery when a failure page occurs. However, this invention is not limited to a recovery at a failure, but is applicable to a general process which includes a database update journal. In this case, the backup version page table is not necessarily a volatile storage medium.

According to the present invention, a shadow page method can be employed in an on-line database system wherein a plurality of on-line transactions update the database at a time and a message is transmitted to or received from a terminal. Conventionally, such a system employs a method wherein database update journal information is fetched to perform a recovery process using the fetched information, for example, at a system/transaction failure. The present invention reduces the fetch amount of journal information as compared with the conventional method. For example, assume that the page size is about 4K bytes and the page number and slot number are 4K bytes, and that information before and after update is fetched in both the cases. The fetch amount of journal can be reduced by 1/10 in case an average update data amount per page is 60 bytes, and by 1/17 in case of 100 bytes (comparison only with respect to the update journal information). If update is concentrated on a particular page, the fetch amount of update journal can be reduced considerably.

Further, according to the present invention, the page table update overhead in a shadow page method is reduced by referring/updating the current version page table and the current version slot use map at a normal operation.

Furthermore, as compared with a conventional method wherein the backup version page table is fetched into a non-volatile memory disk or the like at each transaction, the present invention can achieve high speed operation by transferring the backup version page table to a non-volatile memory at a checkpoint after a plurality of transactions (e.g., after 1000 transactions).

A fourth embodiment aims to solve the problems (1) to (4) of the prior art method described previously, which uses a database update journal to recover a database failure.

To solve the problems (1) and (2), a database is divided into a plurality of sub-areas. Backup files each having the contents of each sub-area and differential files each having updated information of each sub-area sequentially recorded, are provided.

To solve the problems (3) and (4), the backup file and the differential file provided for each sub-area are merged together to reflect the contents of the differential file to the backup file at a desired time and update it.

The operation of the above structure will be summarized as follows:

(1) To update the information in the database, the information is written in a differential file corresponding to a sub-area concerned. The output operation of a differential file for a single sub-area is performed serially and time-sequentially. The output operation of different files for different sub-areas, however, may be performed in parallel.

Therefore, by a suitable division into sub-areas of the database in accordance with the database capacity or update frequency at particular sub-area, the differential file output operation does not become a bottle neck of a system performance.

(2) If the information in the database storage medium is destructed, it is recovered using only the differential file corresponding to the sub-area including the information and the backup file. Particularly, the necessary portion of the backup file is loaded into the destructed portion of the sub-area of the database storage medium, and the update information of the differential information is overwritten upon the sub-area to recover the destructed information.

As a result, the amount of information to be analyzed for recovery is small to thereby shorten a medium failure recovery time. This effect is further enhanced due to the backup file update described in the following (3).

(3) When the storage amount of a differential file for a certain sub-area increases, the backup file corresponding to the sub-area is updated using the differential file. Namely, the differential file and the backup file are merged and the update information of the differential file is overwritten upon the backup file to thereby make the contents of the backup file coincident with the latest contents of the sub-area. Therefore, the differential file medium is made again usable.

As a result, an access to the database for copying is not inhibited to thereby improve the availability of the database. Further, increase of the storage amount of a differential file can be avoided.

The fourth embodiment of the present invention will now be described with reference to FIGS. 13 to 16.

Figure 13:
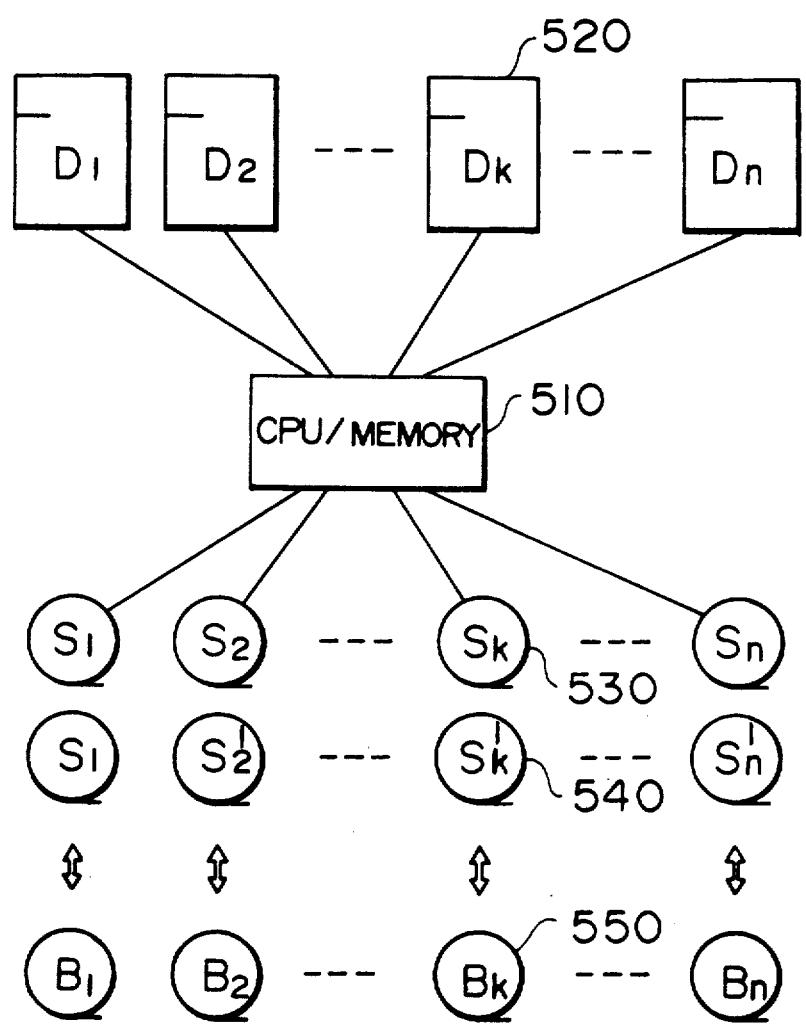
FIG. 13 is a block diagram showing the feature and structure of a fourth embodiment of this invention.
Figure 14:
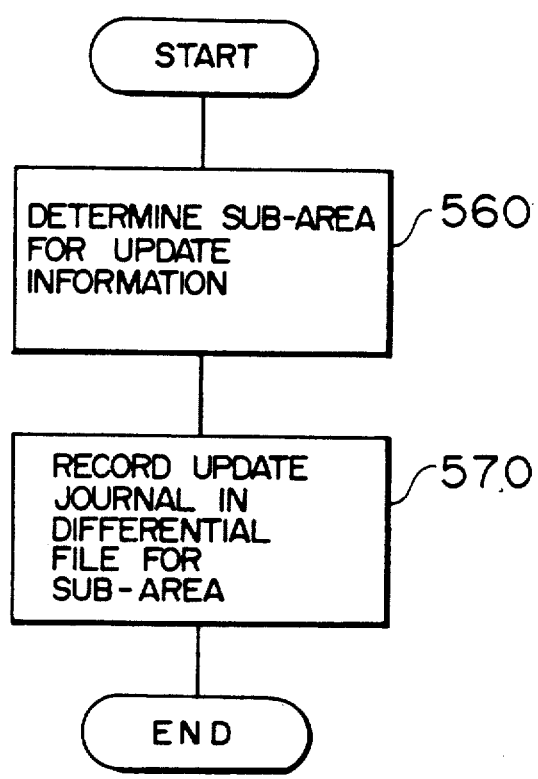

First, the structure of the system will be described. FIG. 13 illustrates the feature and system structure of this embodiment. A database 520 and differential files 530 are coupled to a CPU/memory 510. Alternate differential files 540 and backup files 550 are also included in the system structure. As shown in FIG. 13, the differential files, the alternate differential files, and the backup files are recorded in medium such as magnetic tapes capable of off-line recording information. The database is divided into n sub-areas Dk (k=1, ..., n).

Although each sub-area is shown as a separate medium in FIG. 13 for simplicity purpose, the sub-areas are not necessarily limited to such arrangement. The backup file, differential file, and alternate differential file corresponding to a sub-area Dk are respectively represented by Bk, Sk, and Sk' (k=1, 2, ..., n). Differential files Sk and Sk' are used alternately as described later.

Next, the operation of the system will be described. The description of the system operation is given for a database update operation, a database medium failure operation, and a backup file update operation.

(1) Database Update Operation

If the information in a sub-area Dk of the database is updated, the update contents are fetched into a corresponding differential file Sk simultaneously therewith. A fetch method is similar to a known fetch method for database update journal. Fetching the update contents into the differential file is executed not only at a database update by a normal transaction but also at a database update by a system/transaction failure recovery. (If the capacity of the database buffer in the memory 510 is not sufficiently large, all the information to be database update results by the transaction completed in a normal manner. Therefore, it is necessary at system,/transaction failure to make the part of the database update results invalid to restore the initial information.) The process flow is shown at 560 to 570 in FIG. 14.

An output operation for a single differential file Sk is performed time-sequentially, but the operation for different differential files Sk and Sj (k≠j) may be performed in parallel at the same time.

(2) Database Medium Failure Operation

If the information in a sub-area Dk of the database is destructed, it is received using the corresponding backup file Bk and the differential file Sk as in the following manner. First, the portion corresponding to the destructed portion in Dk of Bk is loaded into the destructed portion. Next, the information in the differential file is time-sequentially read to be analyzed, and the information is recovered using the journal regarding the destructed portion. The recovery method is similar to a known recovery method for database update journal. (However, if the process "Backup File Update Process" to be described in (3) is not still completed with respect to Bk and if the information not reflected to Bk is contained in Sk', this process (2) is performed after executing the process (3)). The process flow is shown by 580 to 5120 in FIG. 15.

If the entire medium of Dk is destructed, Bk is loaded in another medium to perform the above process.

(3) Backup File Update Operation

When a differential file 530 becomes full, an alternate differential file 540 is coupled to the CPU/memory 510 as a new differential file. Namely, assume the differential file corresponding to a sub-area k. Interchange from Sk to Sk' or from Sk' to Sk is carried out. A differential file Sk which has become full can be used as an alternate differential file only after the backup file update process described below is performed.

The contents of Sk is sorted in the order of information storage in the backup file Bk (which is coincident with the information storage order in Dk). Thereafter, Sk and Bk are merged to sequentially reflect the journals of Sk to Bk. The reflecting method is similar to that in the database information recovery process described in (2). As a result, the differential file Sk becomes usable as an alternate differential file Sk'. The contents of the backup file Bk become coincident with the contents of the database sub-area Dk when the differential file Sk became full. This process can be performed by the CPU/memory 510 coupled to the database 520. However, if another CPU/memory is used for performing the process, the database system performance is less influence is less influenced. The process flow is shown by 5130 to 5140 in FIG. 16.

Obviously, it is necessary that the contents of Dk be first copied directly to Bk at least once for initialization. As seen from the foregoing description, according to this embodiment, the database update journal can be outputted at a time to n differential files 530 Si to Sn. Therefore, it can be avoided that fetching database update journal becomes a bottle neck of the system. Further, even if the information in a certain sub-area Sk is destructed, it is not necessary to analyze all the database update journals, but analysis of only Sk can suffice, the shortening a medium failure recovery time. Furthermore, since the contents of the differential file can be reflected to the backup file 550 as necessary, it is not required to inhibit an access to the database for obtaining a backup copy, except for initializing, thus improving the database availability. Still further, since the differential file is re-used after the contents thereof are reflected to the backup file, increase in the storage amount of database update journal is avoided.

A recovery process for a failure has been described in the above embodiment. However, the present invention is not limited thereto but can be applied widely to those cases where the contents prior to update are to be preserved.

According to the above embodiment, the efficiency of fetching a database update journal and recovering the database at a medium failure can be improved. Some of the effects of the embodiment are as follows:

(1) In Fetching Database Update Journal

If the database is divided into n sub-areas, the efficiency of fetching database update journal can be improved by 1 to n times as good as a conventional method. For example, assume that the database update journal is fetched into a magnetic tape (effective availability during transfer is 50%) at a transfer speed of 3M byte/sec and that database update is executed equally by four (n=4) sub-areas. If the amount of database update journal per transaction is 2 KB, the upper limit of process capability becomes 3000 transaction/sec as compared with a conventional 750 (=3×0.5×100/2) transaction/sec.

(2) Database Medium Failure Recovery Efficiency

Assume that a part of the database storage medium is destructed and that the database update journal to be reflected to the backup copy is recorded in n magnetic tapes. The n magnetic tapes must be analyzed at a failure recovery according to the prior method, whereas analysis of only one magnetic tape can suffice according to the present method on condition that each of the n magnetic tapes is provided with a differential file. For example, assume that the capacity of magnetic tape is 1800 M bytes and the transfer speed is 3M byte/sec (effective availability during transfer is 50%). A time required for reading database update journal is reduced from 80 minutes (conventional method) to 20 minutes (present method) at n=4.

(3) Database Availability

According to a conventional method, an access to the part or whole of the database is inhibited during obtained a backup copy from the database. However, such inhibition is not necessary for this method. For example, assume that the database is stored in four (n=4) magnetic disks having a capacity of 1800 M bytes, the transfer speed is 3M byte/sec, and the effective availability during transfer is 50%. The time required for obtaining a backup copy becomes 80 minutes, during which the part or whole of the database is inhibited to be accessed according to the conventional method. However, such inhibition is not necessary for this method, thus improving the database availability.

We claim:

1. A method for updating contents of a database in a system in which said database is constructed of pages which are logical storage locations of data, said system including a current version page table for providing information indicating a correspondence between pages currently updated by a transaction and slots which are physical storage locations of data in the database storage medium wherein currently updated contents of the pages are stored, a backup version page table for providing information indicating a correspondence between the pages of said database and slots forming physical storage locations of data in a database storage medium in which the contents of pages to be recovered are stored and for storing therein a copy of the contents of said current version page table at a checkpoint and a journal file for storing a journal record, comprising the steps of:

(a) updating contents of at least one page of said database;
(b) updating contents of said current version page table when contents of a page of said database are updated;
(c) copying the updated contents of the current version page table into the backup version page table at the checkpoint;
(d) storing said journal record which is representative of the updated contents of the current version page table into said journal file before completion of a transaction;
(e) storing a journal record which is representative of a completion of said transaction into said journal field at completion of said transaction; and
(f) restoring the contents of the current version page table based on the backup version page table and the journal file so that the current version page table includes updates of the current version page table due to the page updating of the database, at a system failure;

wherein at a time of system failure, by fetching journal records from said journal file and analyzing said fetched journal records, a terminal message and updated system management information in a main storage are recovered respectively for complete transactions; and by using the journal record representative of the updated contents of said current version page table associated with the database updates produced by a transaction, and said backup version page table, said current version page table is recovered such that only the change of said current version page table associated with the database updates by the complete transactions is restored to said current version table to thereby ensure logical integrity of the database.

2. A method for updating contents of a database in a system in which said database is constructed of pages which are logical storage locations of data, said system including a current version page table for providing information indicating a correspondence between pages currently updated by a transaction and slots which are physical storage locations of data in the database storage medium wherein currently updated contents of the pages are stored, a backup version page table for providing information indicating a correspondence between the pages of said database and slots forming physical storage locations of data in a database storage medium in which the contents of pages to be recovered are stored and for storing therein a copy of the contents of said current version page table at a checkpoint and a journal file for storing a journal record, comprising the steps of:

(a) updating contents of at least one page of said database;

(b) updating contents of said current version page table when contents of a page of said database are updated;

(c) copying the updated contents of the current version page table into the backup version page table at the checkpoint;

(d) storing said journal record which is representative of the updated contents of the current version page table into said journal file before completion of a transaction;

(e) storing a journal record which is representative of a completion of said transaction into said journal field at completion of said transaction; and (f) restoring the contents of the current version page table based on the backup version page table and the journal file so that the current version page table includes updates of the current version page table due to the page updating of the database, at a system failure;

wherein a plurality of backup page tables are provided in said non-volatile storage medium at a checkpoint under system operation, said plurality of backup version page tables are cyclically used and selected sequentially as an object to be updated, and the selected backup version page table is updated by storing a copy of the contents of the updated current version page table into said backup version page table.

3. A method according to claim , wherein at a time of recovery of said current version page table when a system failure occurs, by using the journal record in said journal file representative of the updated contents of said current version page table associated with the database update by a transaction and the latest effectively updated backup version page table among said plurality of backup version page tables in said non-volatile storage medium, said current version page table is recovered such that only the change of said current version page table associated with the database updates by the complete transactions is restored.

4. A method for updating contents of a database in a system in which said database is constructed of pages which are logical storage locations of data, said system including a current version page table for providing information indicating a correspondence between pages currently updated by a transaction and slots which are physical storage locations of data in the database storage medium wherein currently updated contents of the pages are stored, a backup version page table for providing information indicating a correspondence between the pages of said database and slots forming physical storage locations of data in a database storage medium in which the contents of pages to be recovered are stored and for storing therein a copy of the contents of said current version page table at a checkpoint and a journal file for storing a journal record, comprising the steps of:

(a) updating contents of at least one page of said database;

(b) updating contents of said current version page table when contents of a page of said database are updated;

(c) copying the updated contents of the current version page table into the backup version page table at the checkpoint;

(d) storing said journal record which is representative of the updated contents of the current version page table into said journal file before completion of a transaction;

(e) storing a journal record which is representative of a completion of said transaction into said journal field at completion of said transaction; and (f) restoring the contents of the current version page table based on the backup version page table and the journal file so that the current version page table includes updates of the current version page table due to the page updating of the database, at a system failure;

wherein there is provided a checkpoint dump file for storing system management information in main storage at a checkpoint, and wherein the checkpoint dump file of said current version page table is placed into said checkpoint dump file at a checkpoint, and at the end of system operation said backup version page table in said non-volatile storage medium is updated by storing a copy of the contents of said current version page table to said backup version page table.

5. A method according to claim 4, wherein at a time of recovery of said current version page table when a system failure occurs, by using the journal record in said journal file representative of the contents of change of said current version page table associated with the database update by a transaction, a latest, effectively stored checkpoint dump of said current version page table in said checkpoint dump file, and said backup version page table in said non-volatile storage medium, said current version page table is recovered such that only the change of said current version page table associated with the database update by the transaction whose journal record indicates the completion of the transaction is restored.

6. A method for updating contents of a database in a system in which said database is constructed of pages which are logical storage locations of data, said system including a current version page table for providing information indicating a correspondence between pages currently updated by a transaction and slots which are physical storage locations of data in the database storage medium wherein currently updated contents of the pages are stored, a backup version page table for providing information indicating a correspondence between the pages of said database and slots forming physical storage locations of data in a database storage medium in which the contents of pages to be recovered are stored and for storing therein a copy of the contents of said current version page table at a checkpoint and a journal file for storing a journal record comprising the steps of:

(a) storing a journal record which is representative of a completion of a transaction into said journal file at completion of said transaction; and (b) restoring the content of the current version of the page table based on the backup version of the page table so that the current version of the page table includes updates of the current version of the page table due to the page updating of the database of the system failure;

wherein at a time of system failure, by fetching journal records from said journal file and analyzing said fetched journal records, a terminal message and updated system management information in a main storage are recovered respectively for complete transactions; and by using the journal record representative of the updated contents of said current version page table associated with the database updates produced by a transaction, and said backup version page table, said current version page table is recovered such that only the change of said current version page table associated with the database updates by the complete transactions is restored to said current version table to thereby ensure logical integrity of the database.

7. A method for updating contents of a database in a system in which said database is constructed of pages which are logical storage locations of data, said system including a current version page table for providing information indicating a correspondence between pages currently updated by a transaction and slots which are physical storage locations of data in the database storage medium wherein currently updated contents of the pages are stored, a backup version page table for providing information indicating a correspondence between the pages of said database and slots forming physical storage locations of data in a database storage medium in which the contents of pages to be recovered are stored and for storing therein a copy of the contents of said current version page table at a checkpoint and a journal file for storing a journal record comprising the steps of:

(a) storing a journal record which is representative of a completion of a transaction into said journal file at completion of said transaction; and (b) restoring the content of the current version of the page table based on the backup version of the page table so that the current version of the page table includes updates of the current version of the page table due to the page updating of the database of the system failure;

wherein a plurality of backup page tables are provided in said non-volatile storage medium at a checkpoint under system operation, said plurality of backup version page tables are cyclically used and selected sequentially as an object to be updated, and the selected backup version page table is updated by storing a copy of the contents of the updated current version page table into said backup version page table.

8. A method according to claim 7, wherein at a time of recovery of said current version page table when a system failure occurs, by using the journal record in said journal file representative of the updated contents of said current version page table associated with the database update by a transaction and the latest effective updated backup version page table among said plurality of backup version page tables in said non-volatile storage medium, said current version page table is recovered such that only the change of said current version page table associated with the database updates by the complete transactions is restored.

9. A method for updating contents of a database in a system in which said database is constructed of pages which are logical storage locations of data, said system including a current version page table for providing information indicating a correspondence between pages currently updated by a transaction and slots which are physical storage locations of data in the database storage medium wherein currently updated contents of the pages are stored, a backup version page table for providing information indicating a correspondence between the pages of said database and slots forming physical storage locations of data in a database storage medium in which the contents of pages to be recovered are stored and for storing therein a copy of the contents of said current version page table at a checkpoint and a journal file for storing a journal record comprising the steps of:

(a) storing a journal record which is representative of a completion of a transaction into said journal file at completion of said transaction; and (b) restoring the content of the current version of the page table based on the backup version of the page table so that the current version of the page table includes updates of the current version of the page table due to the page updating of the database of the system failure;

wherein there is provided a checkpoint dump file for storing system management information in a main storage at a checkpoint, and wherein the checkpoint dump file of said current version page table is placed into said checkpoint dump file at a checkpoint, and at the end of system operation said backup version page table in said non-volatile storage medium is updated to store the contents of said current version page table to said backup version page table.

10. A method according to claim 9, wherein at a time of recovery of said current version page table when a system failure occurs, by using the journal record in said journal file representative of the updated contents of said current version page table associated with the database update by a transaction, a latest, effectively stored checkpoint dump of said current version page table in said checkpoint dump file, and said backup version page tables in said non-volatile storage medium, said current version page table is recovered such that only the change of said current version page table associated with the database update by the transaction whose journal record indicates the completion of the transaction is restored.

* * * * *